United States Patent [19]
Booth

[11] Patent Number: 5,887,773
[45] Date of Patent: Mar. 30, 1999

[54] AD INFO VISOR

[76] Inventor: Matthew D. Booth, 1621 Hotel Cir. So. E-305, San Diego, Calif. 92108

[21] Appl. No.: 921,963

[22] Filed: Sep. 2, 1997

[51] Int. Cl.$^6$ ....................................................... B60R 7/05
[52] U.S. Cl. ............................ 224/312; 224/277; 224/572
[58] Field of Search ..................... 224/312, 277, 224/572; D12/417

[56] References Cited

U.S. PATENT DOCUMENTS

| | | | |
|---|---|---|---|
| D. 325,554 | 4/1992 | Min-Senn | D12/417 |
| 2,707,072 | 4/1955 | Sims | 224/312 |
| 2,931,114 | 4/1960 | Peterson | 224/312 |
| 5,301,856 | 4/1994 | Newsome | 224/312 |
| 5,379,929 | 1/1995 | Eskandry | 224/312 |
| 5,422,155 | 6/1995 | Spence, Jr. | 428/76 |

FOREIGN PATENT DOCUMENTS

| 204412 | 11/1955 | Australia | 224/312 |
|---|---|---|---|

*Primary Examiner*—Linda J. Sholl

[57] ABSTRACT

A motor vehicle window visor attachment that when affixed to visors will provide operators of vehicle with a handy place to store and log personal information pertinent to operator and geographic area where vehicle is most generally operated. A plastic pouch for storage of important papers, a writing instrument, advertising, a map, and an area on attachment that erasable notes may be written.

4 Claims, 2 Drawing Sheets

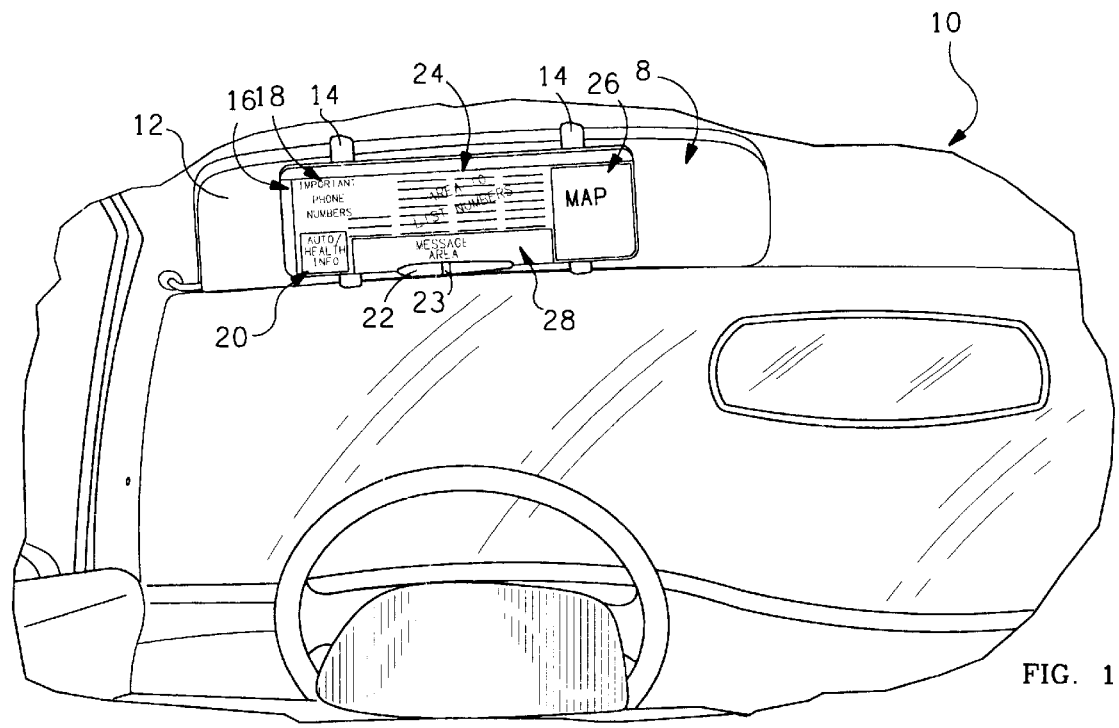
FIG. 1
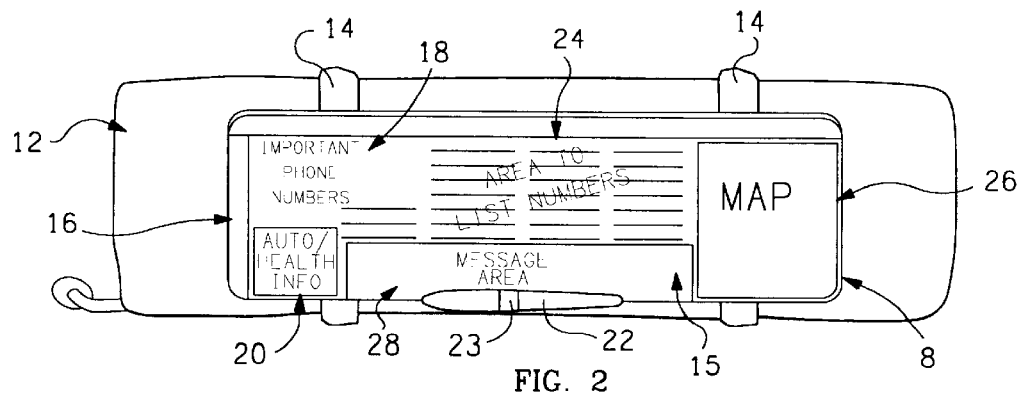
FIG. 2
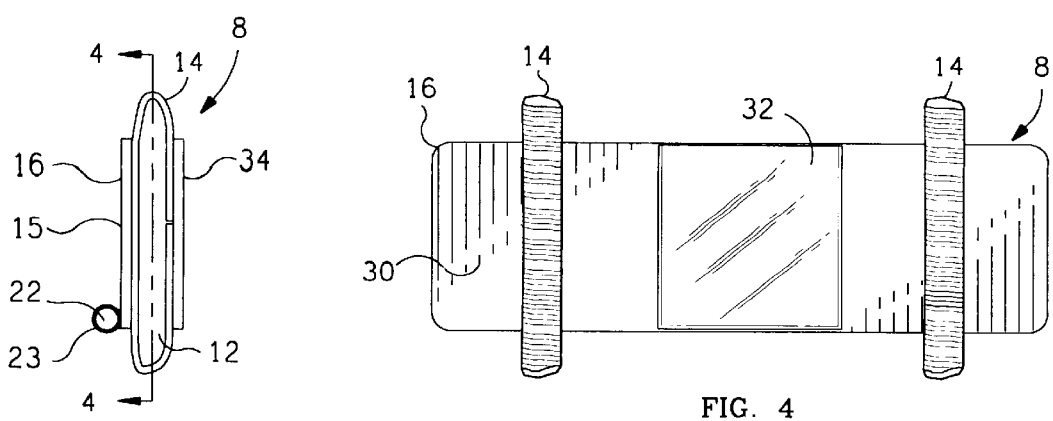
FIG. 3
FIG. 4

AD INFO VISOR

BACKGROUND

1. Field of Invention

This invention relates in general to motor vehicle window visor attachments. More particularly, the invention concerns a device which can be removably affixed to a motor vehicle window visor and provide vehicle operator a place to store and log personalized information useful to operator and the geographic area where vehicle is most generally operated. The invention will also provide a pouch to keep important papers, a writing instrument, and advertising messages.

2. Description of the Prior Art

Cellular phone use by business and the private sector is increasing rapidly. The cost of coupon and direct mail advertising is steadily increasing along with paper and printing expenses.

The prior art is replete with various types of automobile visor attachments. These prior art attachments typically include rather complex wallet-like or envelope devices having a number of pockets within which various articles can be placed. The devices are variously clipped, strapped, or otherwise removably connected to the visor. Generally, these devices are of a bulky make-up to use and typically are inordinately expensive to manufacture.

Examples of prior art visor attachments are those described in U.S. Pat. No. 5,379,929 (1994) and U.S. Pat. No. 5,516,018 (1995) issued to Eskandry; U.S. Pat. No. 5,402,924 (1994) issued to Gibson; and U.S. Pat. No. 4,034,910 (1976) issued to Rogers. As will better be appreciated from the discussion which follows, the visor attachment of the present invention simply provides operators of said vehicles with helpful information regarding emergency phone numbers, personal phone numbers, personal health information, oil change mileage information, a map, an erasable dry note pad with writing instrument, and a pouch to store vehicle registration and insurance papers.

The present invention will provide a venue for businesses to inexpensively advertise their goods and services right inside said vehicles, for the life of vehicle without incurring ongoing advertising paper and printing costs.

The present invention is easily affixed to vehicle visors and can be manufactured inexpensively which will be discussed in detail in the description of the preferred embodiment.

SUMMARY OF THE INVENTION

The primary object of the present invention is to provide a device which can be easily affixed to and removed from the visor of any automobile, truck, van, R.V., boat, or commercial vehicle and one which permits user to store and log information that will be useful for the operator to have in the motor vehicle.

It is also an object of the present invention to provide a visor attachment of the character described with advertising messages on the back side of the back piece of the device.

Another object of the invention is to produce the front piece of the visor attachment described using a melamine board, which is easily erasable using a dry erase pen and a round holder for such a pen.

A further object of the invention is to provide a visor attachment of the class described with a pouch on the back side of the front piece which user can easily store vehicle registration and insurance papers.

Still another object of the invention is to provide a visor attachment of the aforementioned character that is lightweight, compact, very easy to use, and extremely inexpensive to manufacture in quantity.

Yet still another object of the invention is to provide a visor attachment of the class described in the preceding paragraphs that is both attractive in appearance and extremely durable in use.

The foregoing objects can be accomplished by providing a device comprising two rectangular pieces of equal size and comparable thickness, the front piece made from a melamine board, the back piece made of a strong vinyl material. A plastic pouch attached to back side of front piece, a round holder for a dry erase pen on front piece, and a pair of spaced apart stretchable elastic bands of equal size, that when attached to front and back pieces form elastic band loops, thereby the invention will hold securely on visor and be easily visible to operator of vehicle.

BRIEF DESCRIPTION OF THE DRAWINGS

FIG. 1 is a pictorial view of the proposed invention attached to a motor vehicle window visor in the up position from inside said motor vehicle.

FIG. 2 is a front elevation view of the front piece of the proposed invention attached to a motor vehicle window visor in the up position.

FIG. 3 is a side elevation view of the proposed invention attached to a motor vehicle window visor.

FIG. 4 is a back elevation view of the back side of the front piece of the proposed invention.

DESCRIPTION OF THE PREFERRED EMBODIMENTS

Figure 5:
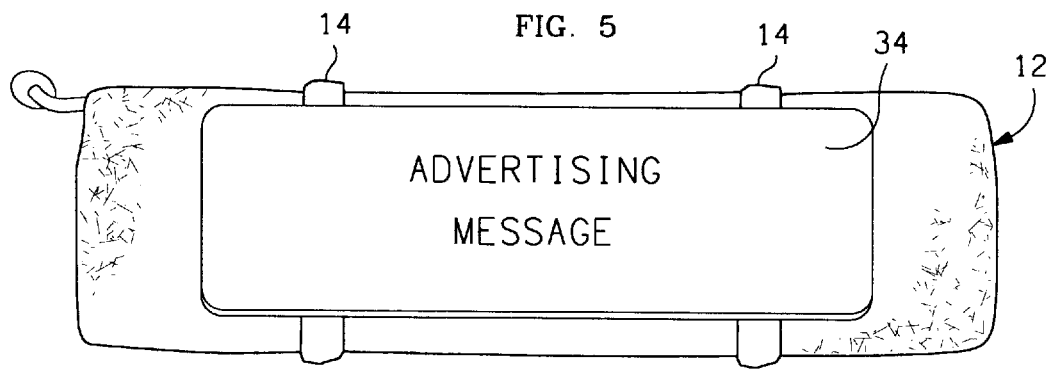
FIG. 5 is a front elevation view of the front side of the back piece of the proposed invention.

Referring to the drawings and particularly to FIGS. 1 through 5, one form of the ad info visor of the present invention is there illustrated and generally designated with the numeral 8. The ad info visor 8, which is adapted to be removably interconnected with the visor 12 of a motor vehicle, comprises two rectangular pieces 16 and 34 of about equal size and thickness.

The front piece 16 is preferably made from a strong melamine board. The back piece 34 is preferably made from a strong vinyl material. The two pieces 16 and 34 are connected together, preferably using a pair of stretchable elastic bands 14, of equal size, each having a first and second end, thereby forming a pair of spaced apart visor receiving loops, as best seen in FIG. 3. The proposed intention can thereby be received on motor vehicle window visors of various sizes and thicknesses and will hold snugly. The stretchable elastic bands 14 will be adhesively attached to the back side 30 of piece 16 and the back side of piece 34 which is not shown, thereby means for receiving loops.

As shown best in FIG. 2, the front side 15 of the front piece 16 of the ad info visor will be screen printed thereby providing sections to store and log information which will be useful to operators of motor vehicle. The front piece 16, made of erasable melamine board, will allow operator of vehicle to tailor proposed ad info visor invention 8 with personal information and store information useful in the geographic area where vehicle is most generally operated; section 18 is an area to list phone numbers of an emergency nature, such as police, fire, coast guard, etc.; 20 for motor vehicle oil change mileage information and personal health information, such as driver's blood type and allergic to; 24 for personal phone numbers such as mom and dad, best friend, physician, dentist, insurance company, etc.; 26 an area map; 28 personal message area for jotting down a note; 23 a round holder for a dry erase writing instrument, 22.

As shown in FIG. 4, the back side 30 of the front piece 16 will be blank, preferably a plastic pouch 32 will be adhesively attached to the back side 30 of front piece 16, thereby providing vehicle operators a handy place to keep important papers such as motor vehicle registration and proof of insurance papers.

As shown in FIG. 3, the proposed ad info visor invention 8 will have a round holder 23, preferably made from plastic, intended to hold a dry erase marking pen 22 securely to piece 16, thereby making dry erase pen 22 easily accessible to operator of vehicle.

As shown in FIG. 5, the back piece 34 will provide a venue for advertising messages on its front side, the back side of piece 34, which is not shown, will be blank.

In use, it is believed the proposed invention 8 will easily affix to any window visor of any motor vehicle, which could be in an automobile, truck, RV, van, boat, or commercial vehicle. The stretchable elastic bands 14 will securely hold the proposed ad info visor invention 8 on the visor when operator of said vehicles flips visor to up and down positions to shade operator's eyes from the sun. Also, it is believed that operator of said motor vehicles will find it useful to have an erasable board, piece 16, to which user can store and log personal information and an area to jot down a note 28 such as "honey, pick up some milk and bread on your way home from work today." This will be particulary useful to cellular telephone users. A plastic pouch 32 will provide handy place to keep vehicle insurance and registration papers.

Figure 6:
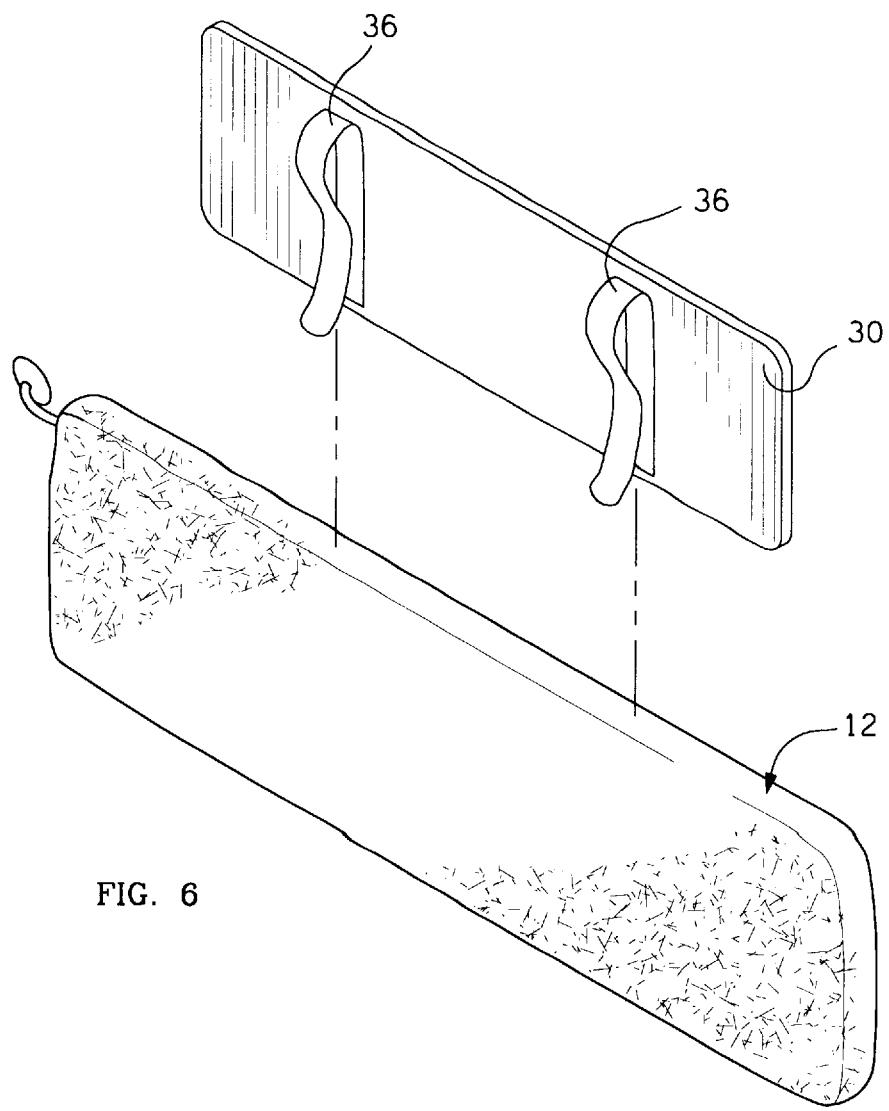
FIG. 6 is a perspective view of an alternate embodiment of the proposed invention.

Alternately, as shown in FIG. 6, the proposed invention discussed in the previous paragraphs can also be accomplished using only the front piece 16 without the back piece 34 shown in FIG. 5. The front piece 16 will alternately be attached to said visors 12 using spring clips 36, shown in FIG. 6. The clips will be securely attached to the back side 30 of piece 16, thereby visor attachment will removably affix to visors of various sizes and thicknesses. The clips 36 will be made from metal or plastic materials.

The back piece 34 shown in FIG. 5 could alternately contain something other than advertising messages, such as tourist information, a map, emergency information, rental car information, taxi information, or a motor vehicle accessory item.

Having now described this invention in detail in accordance with the requirements of the patent statues, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A visor attachment for removable interconnection with a motor vehicle visor comprising:

a front piece having a front side and a back side and being formed of material capable of erasable writing thereon;

a back piece having a front side and a back side and being formed of a vinyl material capable of receiving advertising messages thereon;

a pair of stretchable elastic bands each forming a loop; each said loop having a first side and a second side; said back side of said front piece being attached to the first side of each said loop; said back side of said back piece being attached to the second side of each said loop; said front piece, said back piece and said loops being of a size to allow attachment to the motor vehicle visor with said front piece and said back piece positioned on opposite sides of the visor;

a pouch attached to the back side of the front piece capable of removable deposition of papers therein;

a writing instrument holder attached to the front side of the front piece.

2. The visor attachment of claim 1, wherein said front and back pieces are rectangular shape and about equal in size and thickness.

3. The visor attachment of claim 1, wherein said front side of said front piece is screen printed with sections for printing and logging information of at least one of the following types: emergency phone numbers, personal phone numbers, vehicle oil change information, personal health information, an area map, or personal messages.

4. The visor attachment of claim 1, further comprising a dry erase writing instrument.

\* \* \* \* \*